United States Patent

Buchholz et al.

[11] Patent Number: 5,397,061
[45] Date of Patent: Mar. 14, 1995

[54] APPARATUS FOR INJECTING A FUEL-GAS MIXTURE

[75] Inventors: Juergen Buchholz, Lauffen; Ferdinand Reiter, Markgroeningen; Martin Maier, Moeglingen, all of Germany

[73] Assignee: Robert Bosch GmbH, Stuttgart, Germany

[21] Appl. No.: 197,578

[22] Filed: Feb. 16, 1994

Related U.S. Application Data

[63] Continuation of Ser. No. 19,490, Feb. 19, 1993, abandoned.

[30] Foreign Application Priority Data

Feb. 26, 1992 [DE] Germany ............ 42 05 887.2

[51] Int. Cl.⁶ ............................................. F02M 67/02
[52] U.S. Cl. .................................. 239/408; 239/417.3
[58] Field of Search .................... 123/531; 239/416.4, 239/416.5, 417.3, 424.5, 600, 585.1–585.5, 296, 428.5

[56] References Cited

U.S. PATENT DOCUMENTS

| | | | |
|---|---|---|---|
| 2,970,772 | 2/1961 | Boosinger et al. | 239/105 |
| 4,747,384 | 5/1988 | Hafner et al. | 239/585.1 X |
| 5,002,231 | 3/1991 | Reiter et al. | 239/585.1 |
| 5,035,358 | 7/1991 | Katsuno et al. | 239/585.1 X |
| 5,174,505 | 12/1992 | Shen | 123/531 X |
| 5,193,743 | 3/1993 | Romann et al. | 239/585.5 X |
| 5,197,672 | 3/1993 | Grytz et al. | 239/585.5 X |
| 5,207,383 | 5/1993 | Hans et al. | 123/531 X |

FOREIGN PATENT DOCUMENTS 4026721 2/1992 Germany.
4121372 12/1992 Germany.

Primary Examiner—Andres Kashnikow
Assistant Examiner—Kevin Weldon
Attorney, Agent, or Firm—Edwin E. Greigg; Ronald E. Greigg

[57] ABSTRACT

Apparatuses for the injection of a fuel-gas mixture that have a cup-shaped gas enveloping sleeve that surrounds a valve end of a fuel injection valve, in which the base of the gas enveloping sleeve rests directly on a valve end of the fuel injection valve, have already been proposed. In such apparatuses, the danger is that the perforated body, which has injection ports, will be damaged during installation of the gas enveloping sleeve. In the novel apparatus, however, an elastic sealing element is disposed in the direction of the longitudinal valve axis between the valve end of the fuel injection valve and an end of the base portion of the gas enveloping sleeve that faces the valve end. This sealing element lessens the danger of deformation of and damage to a perforated body, having injection ports, of the fuel injection valve at the valve end and makes it possible to compensate for production and installation tolerances. The proposed apparatus for injecting a fuel-gas mixture is especially suitable for mixture-compressing internal combustion engines having externally supplied ignition.

11 Claims, 1 Drawing Sheet

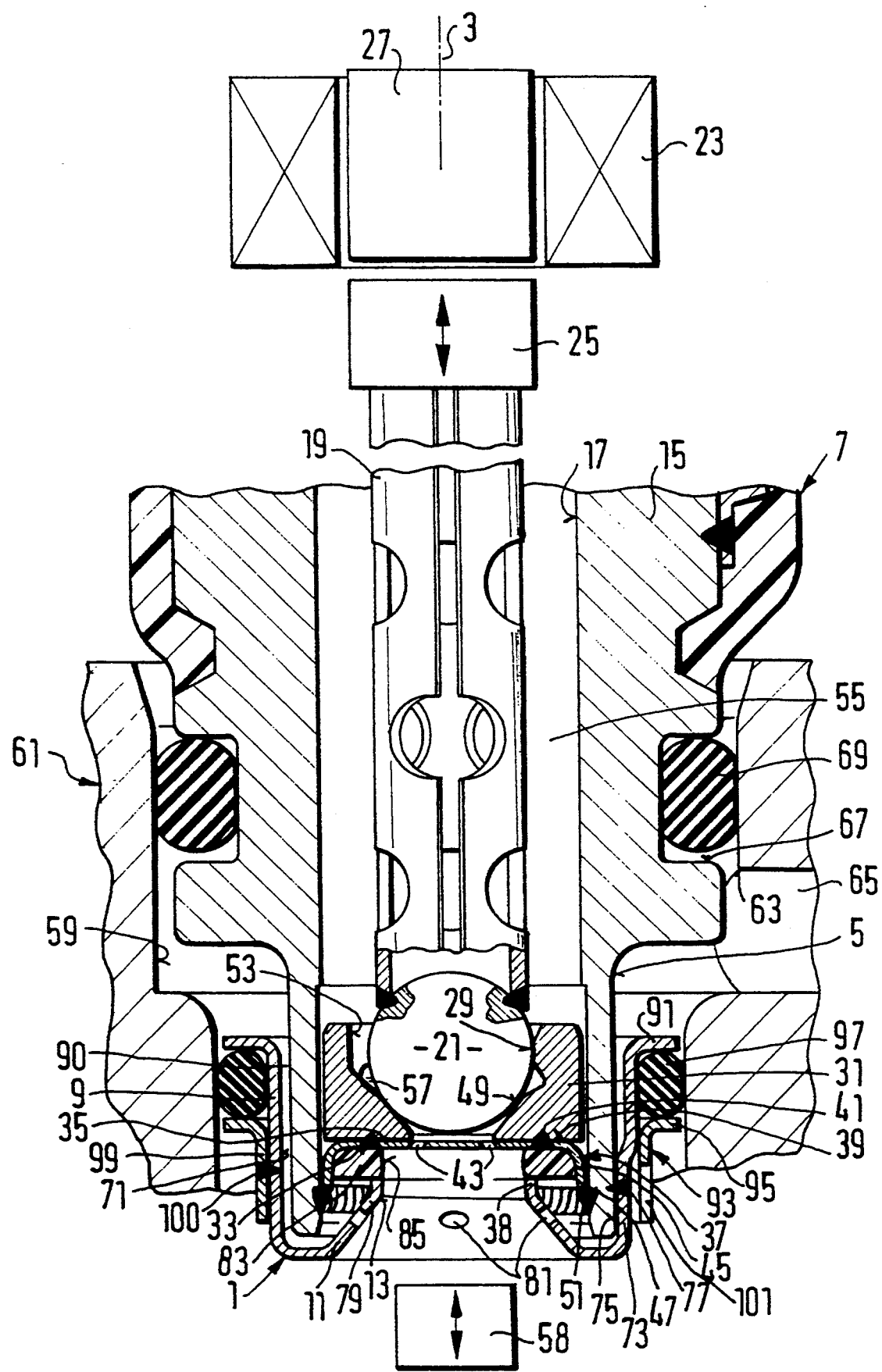

APPARATUS FOR INJECTING A FUEL-GAS MIXTURE

This is a continuation of application(s) Ser. No. 08/019,490 filed on Feb. 19, 1993, now abandoned.

BACKGROUND OF THE INVENTION

The invention relates to an apparatus for injecting a fuel-gas mixture. German Patent Application P 41 21 372.6 discloses an apparatus for injecting a fuel-gas mixture having a fuel injection valve and having a cup-shaped gas enveloping sleeve which with its casing encloses one end of the fuel injection valve axially at least in part and with its base encloses it radially at least in part. With its base, in which a number of gas feed openings are formed, the gas enveloping sleeve rests directly on a perforated body, which has injection ports, of the fuel injection valve. In this disclosed apparatus for injecting a fuel-gas mixture, there is the danger that when the gas enveloping sleeve is installed, the perforated body of the fuel injection valve will be deformed or otherwise damaged. It is virtually impossible, moreover, to compensate for tolerances in the direction of the longitudinal valve axis.

Installing a gas enveloping sleeve as disclosed in German patent application P 41 21 372.6, for example on the valve end of a fuel injection valve, as shown in German patent application P 40 26 721.0 presents the danger that the contact pressure of the base of the gas enveloping sleeve against the perforated body, necessary for sealing purposes, will result in a deformation of the perforated body and hence an adjustment of the valve needle stroke and also of the static injection quantity of the fuel injection valve along with the alteration of the valve injection characteristics.

OBJECT AND SUMMARY OF THE INVENTION

It is a principal object of the invention that, in a simple, inexpensive, and effective manner, the apparatus herein disclosed for the injection of a fuel-gas mixture prevents the deformation of and damage to a perforated body, having the at least one injection port on the valve end of the fuel injection valve, as well as deformation of and damage to the gas enveloping sleeve and ensures the necessary seal between the perforated body and the gas enveloping sleeve. Moreover, the sealing element, which is elastic along the longitudinal axis of the valve, makes it possible to compensate for the tolerances in the production and installation of the apparatus.

Further advantageous features of and improvements to the apparatus are also disclosed hereinafter.

In another object of the invention, for an especially simple embodiment of the cup-shaped gas enveloping sleeve which encloses the valve end of the fuel injection valve, it is advantageous if the elastic sealing element is annular.

In yet another object of the invention, it is particularly advantageous if the elastic sealing element is made of an elastomer. Elastomers have an especially high, rubber-like elasticity so that the danger of deformation and damage at the valve end of the fuel injection valve and at the gas enveloping sleeve is effectively prevented and effective compensation for the production and installation tolerances is achieved.

In still another object of the invention, to form a solid and reliable connection of the gas enveloping sleeve with the valve end of the fuel injection valve, it is advantageous if the casing of the gas enveloping sleeve at least in part contacts the circumference of the valve end of the fuel injection valve and is joined by means of at least one weld to the valve end.

In yet a further object of the invention, for a simple embodiment of the at least one weld joining the gas enveloping sleeve with the fuel injection valve, it is advantageous if a retaining ring placed on the circumference of the casing of the gas enveloping sleeve has at least one assembly opening on its circumference in the area of the at least one weld to be made of the casing of the gas enveloping sleeve.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a fragmentary and simplified view of an exemplary embodiment, according to the invention, of the apparatus for the injection of a fuel-gas mixture.

DESCRIPTION OF THE PREFERRED EMBODIMENT

The drawing shows by way of example part of the apparatus according to the invention for the injection of a fuel-gas mixture into a mixture-compressing, internal combustion engine with externally supplied ignition. This apparatus comprises a cup-shaped gas enveloping sleeve 1, that concentrically envelops a longitudinal valve axis 3 of a valve end 5 of a fuel injection valve 7. The gas enveloping sleeve 1, with its casing 9, surrounds the valve end 5 of the fuel injection valve 7, axially at least in part, and, with its base 11, surrounds it radially at least in part. The base 11 of the gas enveloping sleeve 1 has a mixture injection port 13, extending concentrically to the longitudinal axis 3 of the valve for example.

The partially shown fuel injection valve 7, which for example is electromagnetically actuatable, has a tubular seat holder 15 in which a stepped, lengthwise bore 17 is embodied, concentric to the longitudinal valve axis 3. A valve needle 19, which is tubular for example, and which on its downstream end, facing toward the base 11 of the gas enveloping sleeve 1, is connected with a spherical valve closing body 21, is disposed in the lengthwise bore 17. An electromagnetic circuit indicated in the drawing with a magnet coil 23, an armature 25, and a core 27 serves to effect the axial movement of the valve needle 19 and thus the opening and closing of the fuel injection valve 7. The armature 25 is connected to the end of the valve needle 19 remote from the valve closing body 21, and cooperates with the core 27 and the magnet coil 23.

A guide bore 29 of a valve seat body 31 serves to guide the valve closing body 21 during the movement of the valve needle 19 along the longitudinal valve axis 3. The circumference of the valve seat body 31 has a smaller diameter than that of the stepped, lengthwise bore 17 of the seat holder 15 in the area of the valve seat body 31. The valve seat body 31, on its one, lower face end 33 remote from the valve needle 19, is connected concentrically, for instance, and solidly, with a base 35 of a cup-shaped perforated body 37, so that the base 35 with its upper face end 39, contacts the lower face end 33 of the valve seat body 31. The connection of the valve seat body 31 and the perforated body 37 is effected for example by means of an encompassing and leakproof first weld seam 41 made, for example, with a laser. This kind of installation avoids the danger of deformation of the base 35 of the perforated body 37 in the region of its at least one, or for example two, erosion-formed injection ports 43.

An encompassing retainer yoke 45 that extends along the longitudinal valve axis 3 away from the valve seat body 31 adjoins the base 35 of the cup-shaped perforated body 37 and on the outside is bowed conically outward as far as its end 47. The retainer yoke 45 has a larger diameter on its end 47 than that of the lengthwise bore 17 of the seat holder 15 in the region of the valve seat body 31.

Once the valve needle 19 has been inserted into the lengthwise bore 17 of the seat holder 15, the valve seat part comprising the valve seat body 31 and the perforated body 37 is inserted into the lengthwise bore 17, whereupon the perforated body 37 with its retainer yoke 45 that is bowed outward in a slightly conical fashion, rests on the wall of the lengthwise bore 17 and exerts on it a radially outwardly-directed spring action. The insertion depth of the valve seat part, which comprises the valve seat body 31 and the perforated body 37, into the lengthwise bore 17 of the seat holder 15 determines the initial setting of the stroke of the valve needle 19, because the one terminal position of the valve needle 19, when the magnet coil 23 is not excited, is fixed by means of the contact of the valve closing body 21 against a valve seat face 49 of the valve seat body 31. The other terminal position of the valve needle 19 when the magnet coil 23 is excited is fixed by means of the contact of the armature 25 with the core 27. The distance between these two terminal positions represents the stroke.

On its end 47 with which the retainer yoke 45 of the perforated body 37 contacts the wall of the lengthwise bore 17 of the seat holder 15, the retainer yoke 45 is joined to the wall of the lengthwise bore 17 for example by means of an encompassing and leakproof second weld seam 51. Consequently there are two fastening locations, the one fastening location is the first weld seam 41 with the valve seat body and the other is the second weld seam 51 with the seat holder 15.

The spherical valve closing body 21 cooperates with the valve seat face 49, which tapers frustoconically, for instance, of the valve seat body 31. This valve seat face 49 is embodied in the direction along the longitudinal valve axis 3 between the guide bore 29 and the lower face end 33 of the valve seat body 31. The guide bore 29, as shown on the left side of the longitudinal valve axis 3 in the drawing, has at least one flow opening 53 that enables a flow of fuel from the valve interior chamber 55, defined in the radially outward direction by the lengthwise bore 17 of the seat holder 15, to an annular groove 57 embodied in the fuel flow direction between the guide bore 29 and the valve seat face 49. This annular groove 57, when the fuel injection valve 7 is open, communicates with the injection ports 43 of the perforated body 37. To achieve a precise guidance of the valve closing body 21 and hence of the valve needle 19 during its axial motion, the diameter of the guide bore 29 is so embodied that valve closing body 21, which is spherical, for example, protrudes into the guide bore 29 with little radial spacing.

The exact adjustment of the stroke of the valve needle 19 and thus of the static injected fuel quantity during the steady open state of the valve is effected in the fully-assembled fuel injection valve 7 by comparing the measured actual quantity of fuel injected from the valve to the desired, predetermined set-point quantity and, perhaps in order to set the stroke of the valve needle 19 exactly, distending the perforated body 37 in the direction of the longitudinal valve axis 3 in the region between the second weld seam 51 and the first weld seam 41 in the direction toward the valve needle 19, using a tool 58, and thereby possibly plastically deforming it, in such a manner that the measured actual fuel quantity matches the predetermined set-point fuel quantity.

The apparatus according to the invention can be installed for example in a stepped valve receptacle opening 59 of an intake tube 61, which has a plurality of spaced apart valve receptacle openings 59, one for each cylinder of the internal combustion engine. A gas feed conduit 65 discharges into each of the valve receptacle openings 59 at an inlet opening 63 and serves to supply a gas to the gas enveloping sleeve 1. The gas used may be any of the following, for example: the intake air diverted through a bypass upstream of a throttle valve in the intake tube 61 of the engine, air fed by means of an auxiliary blower, or recirculated exhaust gas or a mixture of air and recirculated exhaust gas. Using recirculated exhaust gas makes it possible to reduce engine emissions.

An upper annular groove 67, in which an upper sealing ring 69 tightly contacting the wall of the valve receptacle opening 59 is disposed, is embodied at the circumference of the valve end 5 of the fuel injection valve 7 facing away from the gas enveloping sleeve 1 above the inlet opening 63 of the gas feed conduit 65.

The casing 9 of the gas enveloping sleeve 1, with the wall of an enveloping bore 71 formed by the casing 9, radially surrounds the circumference of the seat holder 15 at the valve end 5 of the fuel injection valve 7 with radial spacing. In the casing 9, facing the base 11, guide strips 73, for instance five in number, are formed, for example by indenting the casing 9, which are evenly distributed around the circumference of the gas enveloping sleeve 1; they protrude radially inward and contact the circumference of the valve end 5 with bearing faces 75 that describe an approximate circle. The guide strips 73, with their bearing faces, enable a simple centering of the gas enveloping sleeve 1 relative to the fuel injection valve 7. At each of the guide strips 73 and each of the respective bearing faces 75, there is a weld 77, formed for example by a laser, which solidly joins the gas enveloping sleeve 1 at its guide strips 73 with the circumference of the valve end 5 of the fuel injection valve 7. The base 11 of the gas enveloping sleeve 1 has an oblique segment 79 pointing radially inward, inclined obliquely to the bottom 35 of the perforated body 37 of the injection valve 7. The oblique segment 79 of the base 11 forms a portion of the mixture injection port 13 of the gas enveloping sleeve 1. In the oblique segment 79 of the base 11 of the gas enveloping sleeve 1, four evenly spaced gas feed openings 81, for example, are embodied. The oblique segment 79 of the base 11, by its radially inwardly pointing end 38 toward the bottom 35 of the cup-shaped perforated body 37, contacts a sealing element 83, which is annular, for example, and which is elastic at least in the direction of the longitudinal valve axis 3. The sealing element 83 is supported facing away from the oblique element 79 in the direction of the longitudinal valve axis 3 at the bottom 35 of the perforated body 37 and covers for example the first weld seam 41 and impedes the escape of gas between the base 11 of the gas enveloping sleeve 1 and the perforated body 37. Concentrically to the longitudinal valve axis 3, for example, the annular sealing element 83 has an opening 85 through which the aforementioned injected fuel flows through the injection ports 43 of the perforated body 37. The annular sealing element 83 has for example an approximately rectangular cross section. It is, however, also possible for the sealing element 83 to have a circular, oval, or otherwise-shaped cross section. To facilitate the installation and centering of the sealing element 83, it has a diameter that is about the same size as the inside diameter of the retaining rim 45 of the perforated body 37, for example. The sealing element 83 is embodied for example of an elastomer that has a rubber-like elasticity. By means of this elasticity of the sealing element 83, not only are production and installation tolerances compensated for, but when the gas enveloping sleeve 1 is installed at the valve end 5 of the finally assembled and adjusted fuel injection valve 7, damage to or deformation of the perforated body 37 are also prevented in a simple, reliable manner, despite the assurance of the requisite tightness; such damage and deformation would lead to an alteration of the stroke of the valve needle 19 and hence of the valve injection characteristics and the geometry of the fuel stream. Through the gas feed conduit 65 and the inlet opening 63, the gas reaches the valve receptacle opening 59 and from there, through gas flow conduits 90 defined in the circumferential direction by the guide strips 73 and formed between the circumference of the seat holder 15 at the valve end 5 of the fuel injection valve 7 and the wall of the enveloping bore 71 of the casing 9, it reaches the narrow, by way of example circular, gas feed openings 81 of the base 11 of the gas enveloping sleeve 1, and in the mixture injection port 13 this gas meets the fuel, conveyed through the injection ports 43 of the perforated body 37, and atomizes it.

A first radially outwardly pointing retaining flange 91 is embodied on the end, remote from the base 11, of the casing 9 of the gas enveloping sleeve 1. A retaining ring 93, for example L-shaped, is disposed on the circumference of the casing 9 of the gas enveloping sleeve 1 and has a second radially outward pointing retaining flange 95, in the direction of the longitudinal valve axis 3 between the first retaining flange 91 of the gas enveloping sleeve 1 and its base 11, for example on its end facing the first retaining flange 91. In the direction of the longitudinal valve axis 3 between the first retaining flange 91 and the second retaining flange 95 at the circumference of the casing 9 of the gas enveloping sleeve 1, there is a lower sealing ring 97, which rests tightly on the wall of the valve receptacle opening 59 of the intake tube 61. The upper sealing ring 69 and the lower sealing ring 97 prevent the gas, conveyed by means of the gas feed conduit 65, from emerging past the wall of the valve receptacle opening 59.

In the area of the welds 77 of the guide strips 73, of which there are five, for example, the retaining ring 93, in a cylindrical part 99 with which it rests partly on the circumference of the gas enveloping sleeve 1, has at least one assembly opening 101, and may for example have one assembly opening per guide strip. The retaining ring 93 is joined to the casing 9 by means of welds 100, for example five of them, at the area of the cylindrical part of the retaining ring with which it rests on the casing 9 of the gas enveloping sleeve 1. The assembly openings 101 make it possible for the gas enveloping sleeve 1 to be affixed in a trouble-free manner at the valve end 5 of the fuel injection valve 7 by means of the welds 77, even after the retaining ring 93 has been installed on the circumference of the gas enveloping sleeve 1.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An apparatus for the injection of a fuel-gas mixture, having a fuel injection valve that has a valve end with at least one injection port and a longitudinal valve axis, and further having a single piece cup-shaped gas enveloping sleeve (1) that includes a casing portion (9) that encloses the valve end (5) of the fuel injection valve axially at least in part and an integral base portion (11) that encloses said valve end radially at least in part, the gas enveloping sleeve is provided with at least one gas feed opening (81) and a mixture injection port (13) on its base portion, and an elastic sealing element (83) is disposed in a direction of the longitudinal valve axis (3) and is fastened between the valve end (5) of the fuel injection valve (7) and an inner most end (38) of the base portion (11) of the gas enveloping sleeve (1) which faces the valve end (5) to avoid contact between said valve end (5) and said base portion (11).

2. An apparatus as defined by claim 1, in which the elastic sealing element (83) is annular.

3. An apparatus as defined by claim 1, in which the elastic sealing element (83) is embodied of an elastomer.

4. An apparatus as defined by claim 2, in which the elastic sealing element (83) is embodied of an elastomer.

5. An apparatus as defined by claim 1, in which at least one gas feed opening (81) is provided in the base portion (11) of the gas enveloping sleeve (1).

6. An apparatus as set forth in claim 1 which includes a valve seat body confined within said valve end (5), a perforated body (37) secured to an end face of said valve seat body, said perforated body includes injection ports 43 within an area confined by an outlet in said valve seat body.

7. An apparatus as set forth in claim 6, wherein said perforated body includes ends (47) extending outwardly from said valve seat body, and said ends (47) are welded to an inside surface of said valve end (5).

8. An apparatus as defined by claim 1, in which the casing portion (9) of the gas enveloping sleeve (1) rests at least partially on the circumference of the valve end (5) of the fuel injection valve (7) and is joined to the valve end (5) by means of at least one weld (77).

9. An apparatus as defined by claim 8, in which a retaining ring (93) having at least one assembly opening (101) provided upon its circumference in the region of the at least one weld (77) of the casing portion (9) of the gas enveloping sleeve (1) is disposed upon the circumference of the casing portion (9) of the gas enveloping sleeve (1).

10. An apparatus for the injection of a fuel-gas mixture, having a fuel injection valve that has a valve end with at least one injection port and a longitudinal valve axis, and further having a single piece cup-shaped gas enveloping sleeve (1) that includes a casing portion (9) that encloses the valve end (5) of the fuel injection valve axially at least in part and an integral base portion (11) that encloses said valve end radially at least in part, said base portion (11) of the gas enveloping sleeve (1) is slanted obliquely toward the valve end (5) of the fuel injection valve (7) in the direction of the longitudinal valve axis (3), the gas enveloping sleeve is provided with at least one gas feed opening (81) and a mixture injection port (13) on its base portion, and an elastic sealing element (83) is disposed in a direction of the longitudinal valve axis (3) and is fastened between the valve end (5) of the fuel injection valve (7) and an end (38) of the base portion (11) of the gas enveloping sleeve (1) which faces the valve end (5).

11. An apparatus as defined by claim 10, in which at least one gas feed opening (81) is provided in the base portion (11) of the gas enveloping sleeve (1).

* * * * *